(12) United States Patent
Bebout et al.

(10) Patent No.: US 6,938,185 B1
(45) Date of Patent: Aug. 30, 2005

(54) METHOD AND SYSTEM FOR ADAPTING A DEBUGGER TO NEW TARGETS

(75) Inventors: Don W. Bebout, Fountain Valley, CA (US); Varsha T Shamabhat, Rancho Santa Margarita, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 534 days.

(21) Appl. No.: 10/180,480

(22) Filed: Jun. 25, 2002

(51) Int. Cl.[7] ............................................. G06F 11/00
(52) U.S. Cl. ....................................... 714/28; 717/124
(58) Field of Search ............................. 714/28, 40, 27; 703/23; 717/124

(56) References Cited

U.S. PATENT DOCUMENTS

| | | | |
|---|---|---|---|
| 6,738,929 B2 * | 5/2004 | Swoboda et al. | 714/28 |
| 2001/0021985 A1 * | 9/2001 | Aldridge et al. | 714/38 |
| 2002/0087952 A1 * | 7/2002 | Tabe et al. | 717/124 |
| 2004/0111707 A1 * | 6/2004 | Bliss et al. | 717/129 |

* cited by examiner

Primary Examiner—Robert Beausoliel
Assistant Examiner—Marc M. Duncan
(74) Attorney, Agent, or Firm—Farjami & Farjami LLP

(57) ABSTRACT

One disclosed embodiment is a method for adapting a debugger to a selected target. According to this embodiment, the debugger connects to the selected target. Thereafter a debug core in the debugger dynamically loads a module set from a target database that corresponds to the selected target. Next, a debug info/loader, a disassembler, and/or a target support are dynamically loaded based on the module set loaded by debug core. Thereafter, the debug info/loader, disassembler, and/or target support can directly connect to the selected target to retrieve additional target-specific information. By implementing the above method, the debugger can adapt to new or different targets without the need to rebuild different versions of the debugger to suit new or different targets. In other embodiments, a system for implementing the above method, and a computer readable medium containing a computer program for implementing the above method, are disclosed.

23 Claims, 4 Drawing Sheets

METHOD AND SYSTEM FOR ADAPTING A DEBUGGER TO NEW TARGETS

BACKGROUND OF THE INVENTION

1. Field of the Invention

The present invention is generally in the field of debuggers and, more particularly, in the field of debugger retargetability.

2. Background Art

Software for embedded systems is conventionally developed using a single microcontroller or a digital signal processor (DSP) and either an emulation or simulation module to which a debugger is attached. A debugger is a tool that aids a programmer or developer in locating and correcting errors in the system. In the case of a simulation module, the system and the debugger are both implemented in software.

FIG. 1 illustrates a conventional exemplary single-processor system simulation, i.e. debugging system 100. In the present application, the entity upon which a debugger acts will be referred to as a "target" within a "system simulation." A system simulation may include, for example, several targets, a scheduler, and a shared system resource such as a shared memory. Furthermore, a target may contain a central processing unit (CPU), among other elements. In FIG. 1, debugging system 100 includes a conventional debugger, i.e. debugger 110, which communicates with a processor model, i.e. system simulation 120.

Debugger 110 may be used to control and display the state of system simulation 120, through a variety of standard debugging functions. For example, debugger 110 may send "run", "stop", or "step" commands to the target. Furthermore, debugger 110 may "read" data from memory or registers within system simulation 120, or "write" data into memory or registers within system simulation 120. In addition to the aforementioned debugger functions, debugger 110 also requires an additional set of functions and components in order to customize the functionality for a specific target. In particular, a debugger must be designed to have interfaces that are compatible to the various types of registers, memory, or file formats within a target.

Typically, debuggers are customized by the manufacturer according to their intended target, e.g. an Intel® processor or a Motorola® processor. When faced with a new type of target, a conventional debugger must undergo substantial software code modifications, i.e. the debugger must be "retargeted", before it can properly interface with the new target. Referring to the conventional debugging system 100 of FIG. 1, if system simulation 120 was altered or replaced with a different type of system simulation, the manufacturers of debugger 110 would have to build a custom version of debugger 110 that can operate with the new system simulation. For example, the software code in the debug core of debugger 110 may need to be recompiled in order to operate with new types of targets within a new system simulation. Currently, with the rapid changes in processor technologies, manufacturers of debuggers are continually forced to rebuild different versions of their debuggers to suit different processors, a practice that is both time consuming and technically laborious.

Thus there is a need in the art for a debugging system that does not have to be rebuilt or customized in order to effectively and properly operate with different or new targets.

SUMMARY OF THE INVENTION

The present invention is directed to method and system for adapting a debugger to new targets. The present invention overcomes the need in the art for a debugging system that does not have to be rebuilt or customized in order to effectively and properly operate with different or new targets. In one embodiment, the invention is a method for adapting a debugger to a selected target. According to this embodiment, the debugger connects to the selected target through, for example, a debug interface. Thereafter a debug core in the debugger dynamically loads a module set from a target database that corresponds to the selected target. Next, a debug info/loader, a disassembler, and/or a target support are dynamically loaded based on the module set loaded by debug core. Thereafter, the debug info/loader, disassembler, and/or target support can directly connect to the selected target to retrieve additional target-specific information, such as target-specific memory, register, and file format information. By implementing the above method, the debugger can adapt to new or different targets, i.e. the debugger can be "retargeted," without the need to rebuild different versions of the debugger to suit new or different targets.

In other embodiments, the present invention is a system for implementing the above method or, alternatively, a computer readable medium containing a computer program for implementing the above method. In a manner described below, the present invention results in method and system for adapting a debugger to new targets. Other features and advantages of the present invention will become more readily apparent to those of ordinary skill in the art after reviewing the following detailed description and accompanying drawings.

DETAILED DESCRIPTION OF THE INVENTION

The present invention is directed to method and system for adapting a debugger to new targets. The following description contains specific information pertaining to implementation of specific embodiments of the invention. However, one skilled in the art will recognize that the present invention may be implemented in a manner different from that specifically discussed in the present application. Moreover, some of the specific details, which are within the knowledge of a person of ordinary skill in the art, are not discussed to avoid obscuring the present invention.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
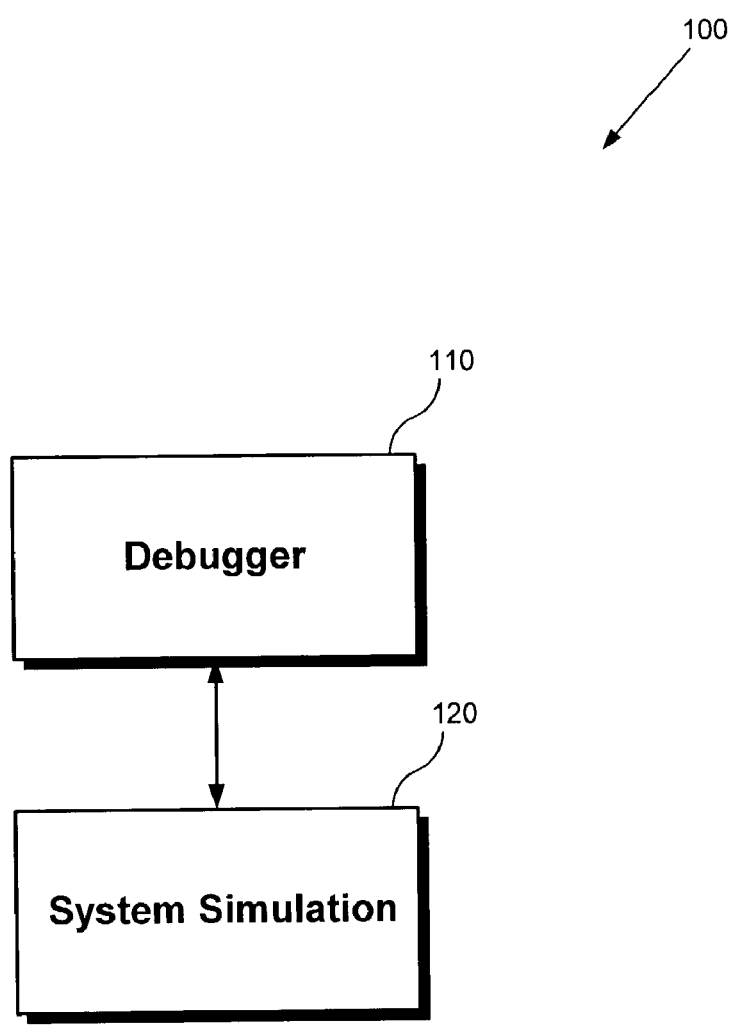
FIG. 1 illustrates an exemplary conventional single processor simulation environment.
Figure 2:
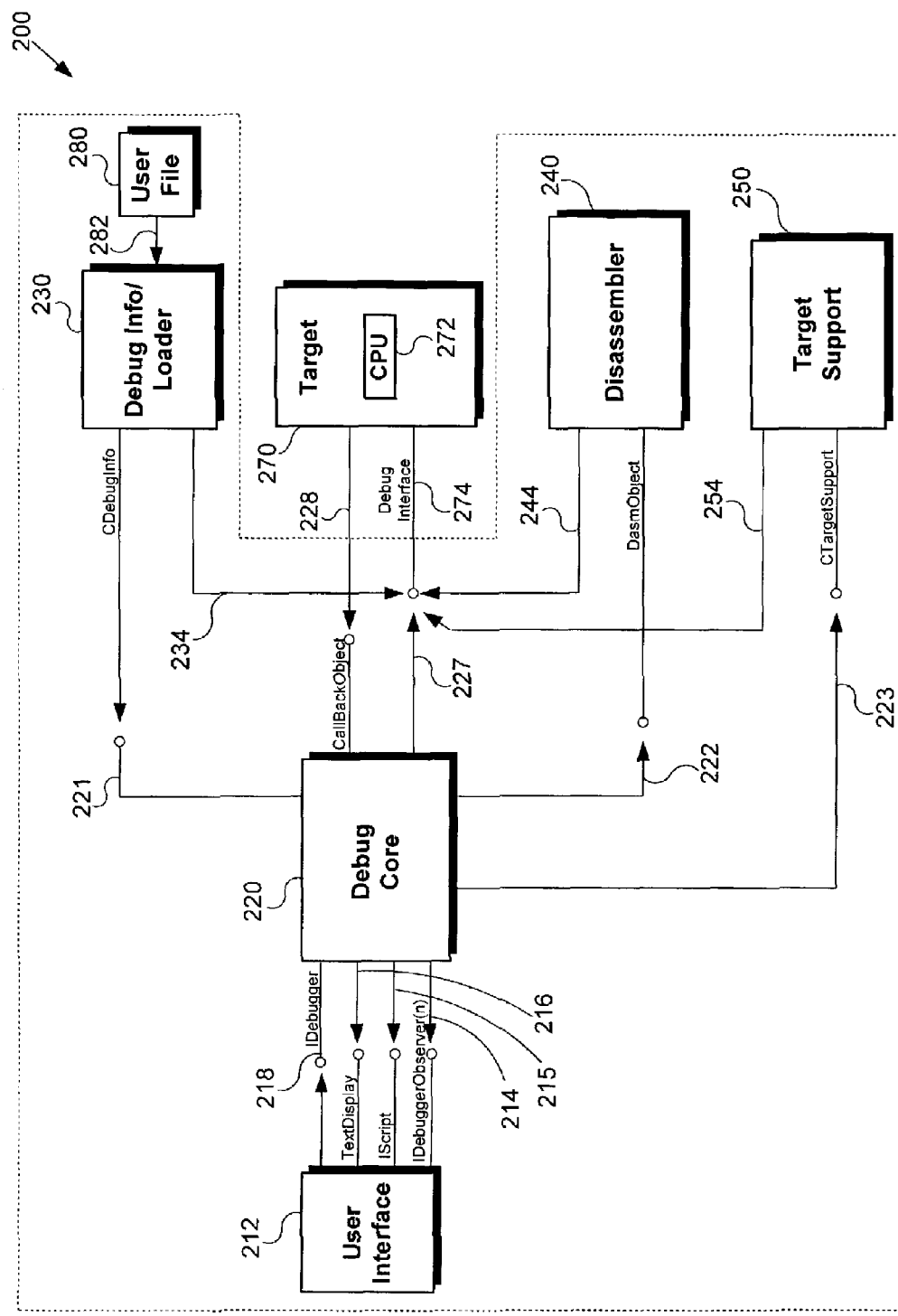
FIG. 2 illustrates an embodiment of an exemplary debugger within the invention's debugging system.

An exemplary embodiment of a debugging system is shown in FIG. 2, i.e. debugging system 200. Debugging system 200 comprises debugger 210 and target 270, where debugger 210 can be used to debug programs that are running in target 270. As shown in FIG. 2, debugger 210 comprises user interface 212, debug core 220, debug info/loader 230, disassembler 240, and target support 250. Additionally, user file module 280 provides input to debug info/loader 230 via communication line 282. Target 270 comprises a single processor, i.e. CPU 272. In one embodiment of the present invention, user interface 212 may be a graphic user interface. User interface 212 may include access to multiple interfaces, e.g. "IDebuggerObserver" via communication line 214, "IScript" via communication line 215, and "TextDisplay" via communication line 216. In one embodiment, debug core 220 is a dynamically loaded library (DLL) that includes access to two interfaces: "IDebugger" via communication line 218 and "CallBackObject" via communication line 228. "IDebugger" and "CallBackObject" may be C++ interfaces implemented as a single class using multiple inheritances.

Referring to debug core 220, communication line 227 facilitates communication with target 270, and communication line 228 facilitates communication from target 270 to debug core 220. Communication line 227 can call a "debug interface" that is exposed by CPU 272 in target 270, i.e. debug interface 274. Moreover, each "debuggable" object in target 270, e.g. CPU 272, may expose a debug interface, e.g. debug interface 274, that can be accessed by debugger 210. Debug core 220 exposes an "application program interface" (API) or a "debug API", via communication line 228, that facilitates communication with target 270. By way of examples, debugger 210 can send "run", "stop", "step", "read", or "write" commands to target 270 via communication line 227 using debug APIs. More specifically, debugger 210 may "read" data from memory or registers within target 270 using a "read API", or "write" data into memory or registers within target 270 using a "write API", via communication line 227. In general, debugger 210 may utilize an API by issuing a "call" to the particular debug API, which is communicated to debug interface 274 of CPU 272, via communication line 227.

In the present invention, debug core 220 and user interface 212 are the CPU-independent portions of debugger 210. That is, user interface 212 and debug core 220 are not target-specific and may be used with any type of target or CPU, without modification. Instead, debug core 220 utilizes a set of additional support components, i.e. debug info/loader 230, disassembler 240, and target support 250, to customize the functionality for a specific target, i.e. target 270. The aforementioned support components are dynamically loaded based on the target, and are collectively referred to as "target-specific support components" in the present application. In other words, debug core 220 contains target-independent software code, while the target-specific code is contained within the aforementioned target-specific support components. In this manner, debugger 210 can be retargeted without reconfiguring or rebuilding debug core 220, or communication lines 221, 222, and 223.

In one embodiment, debug info loader 230, disassembler 240, and target support 250, are each implemented as a DLL that exposes a single C++ interface and includes access to programming interfaces based on the type of target(s) or CPU(s) in the system simulation. As discussed later in the description of FIG. 3, debugger 210 contains a target database which contains numerous sets of target-specific module for each debuggable target type, e.g. for each library or process that implements the debug interface 274. Moreover, debug info/loader 230, disassembler 240, and target support 250, are dynamically loaded based on the appropriate module set in the target database. Referring to FIG. 2, debug info/loader 230 includes interface "CDebugInfo" via communication line 221, disassembler 240 includes interface "DasmObject" via communication line 222, and target support 250 includes interface "CTargetSupport" via communication line 223.

The DasmObject interface exposed by disassembler 240 is a target-specific object which provides disassembly in the form of text to debug core 220. Since the textual representation of code may vary considerably between processors, the DasmObject interface is designed to be sufficiently flexible to work with various types of cores, e.g. RISC or CISC, and various assembly syntaxes. As an example, a disassembler for a typical RISC core may generate one line of text per fixed length instruction, while a disassembler for a CISC core may require a varying number of lines per instruction. Since the information required to perform disassembly varies from core to core or from target to target, disassembler 240 is given direct access to the target so that it can adapt accordingly, i.e. direct access to target 270 via communication line 224. In this way, disassembler 240 can access any memory locations or registers, as required, and reconfiguration of debug core 220 is not required for retargeting.

The CTargetSupport interface exposed by target support 250 is a target-specific object that allows debugger 210 to display target-specific variables and constructs by providing detailed information about the target's compiler, e.g. target 270. For example, before debugger 210 can begin debugging CPU 272 of target 270, target-specific compiler information such as the integer size, e.g. 8-bit processor or 32-bit processor, is required. Target support 250 may utilize a number of functions for retrieving target-specific compiler information, e.g. functions such as "GetSize" for retrieving a desired value from target 270, or "GetVariable" for retrieving a desired variable from target 270. As with disassembler 240, target support 250 is dynamically loaded based on a module set in a target database, and facilitates the retargetability of debugger 210.

Upon connection to target 270, debug core 220 may look for a module that performs target-specific disassembly, i.e. disassembler 240. Debug core 220 may also interface with an image file format specific reader, i.e. debug info/loader 230, which provides debug core 220 with symbolic information through communication line 221. Moreover debug core 220 can also interface with a module that performs target-specific arithmetic for expression parsing, i.e. target support 250. As an example, CPU 272 may be an Advanced RISC-based Machine (ARM) processor that utilizes debug info/loader 230, disassembler 240 for ARM instruction set information, and target support 250 for ARM 'C' compiler information. Communication lines 221, 222, and 223 facilitate communication from debug core 220 to debug info/loader 230, disassembler 240, and target support 250, respectively. Communication lines 234, 244, and 254, facilitate communication from debug info/loader 230, disassembler 240, and target support 250, respectively, to target 270. In other words, debug info/loader 230, disassembler 240, and target support 250, each have direct access to target 270 via communication lines 234, 244, and 254, respectively. The direct access of the target-specific support components to target 270, via communication lines 234, 244, and 254, allows debug core 220 and its interfaces to remain target-independent.

In conventional debuggers, however, the aforementioned direct access from the target-specific support components to the target is not provided. Instead, for example, target-specific information has to be retrieved from the target by the debug core, before being transmitted to the target-specific support components. Consequently, when a new type of target is introduced, reconfiguration of the debug core's software code, as well as the associated communication lines, is required to achieve retargetability.

As an example, CPU 272 of target 270 may be replaced by a CPU that is similar to CPU 272 but differs in one or more instructions, its memory content or registers, i.e. is a variant CPU. When debugger 210 connects to this variant CPU, disassembler 240 will require detailed information specific to the variant CPU's memory and register contents. Disassembler 240 may require detailed memory information, for example, before it can properly convert instructions, e.g. "op codes", from the variant CPU's memory into text. Similarly, debug info/loader 230 and target support 250 may require file formatting and compiler information, respectively, that is specific to the variant CPU. In the present invention, the direct access of debug info/loader 230, disassembler 240, and target support 250 to target 270, via communication lines 234, 244, and 254, respectively, allows them to independently retrieve the necessary target-specific information and adjusting accordingly. This capability eliminates the need to reconfigure or rebuild debug core 220 whenever a new target is introduced, and therefore provides debugger 210 with faster, more flexible retargetability.

Figure 3:
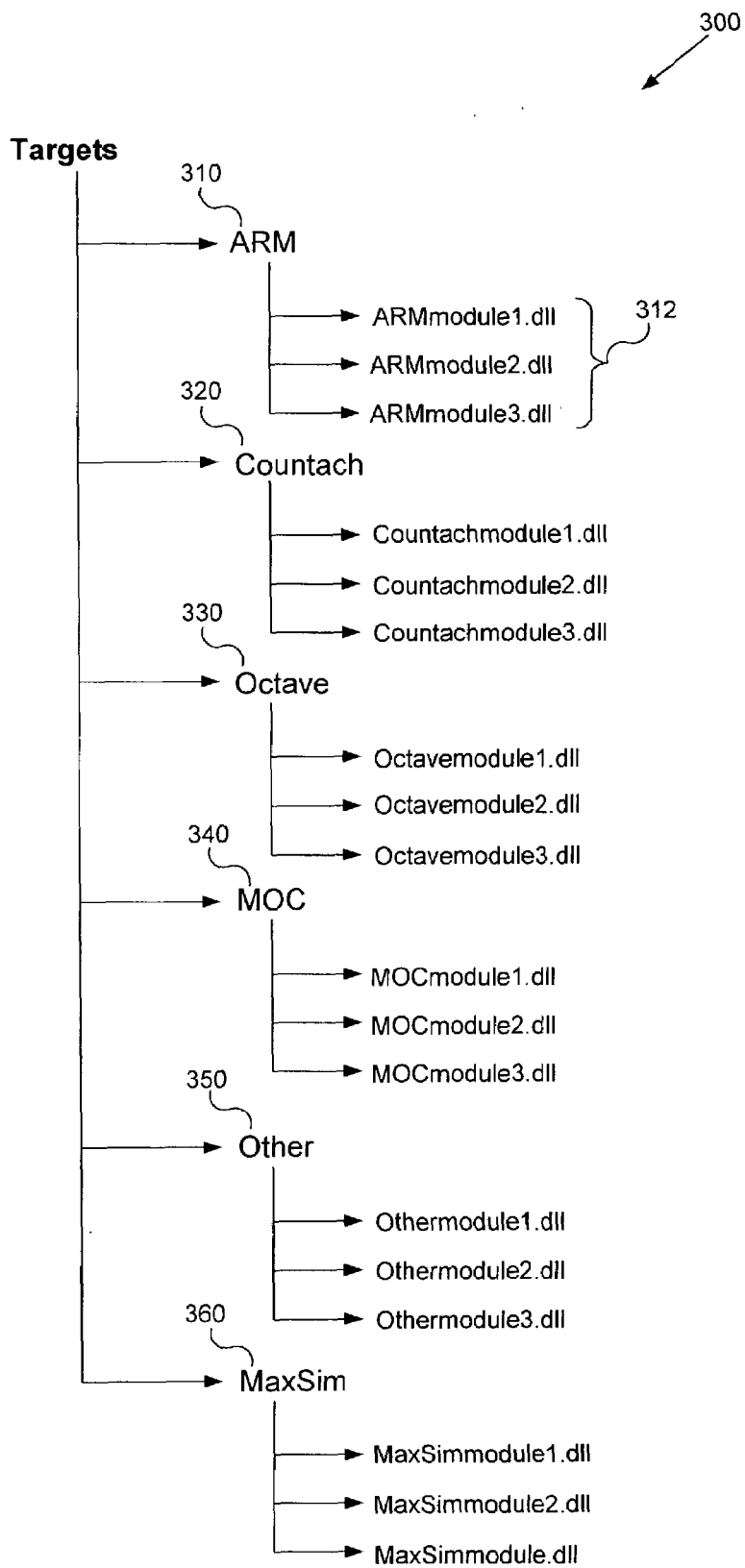
FIG. 3 illustrates an exemplary target database within the invention's debugging system.

Referring to FIG. 3, target database 300 illustrates an exemplary database of targets that are supported by debugger 210. Debugger 210 can support various targets, as shown in target database 300, with various levels of functionality. The functionality is achieved by installing a support package which can add support for integrated development (i.e. compile, link, etc.), disassembly, or source-level debugging capabilities, for example. By way of an example, target database 300 includes six different target processor types, for example, "ARM" 310, "Countach" 320, "Octave" 330, "MOC" 340, "Other" 350, and "MaxSim" 360. ARM 310 can provide source-level debugging capabilities for the ARM processor using, for example, "AIF" and "ELF/Dwarf2" image files.

Below each target processor in target database 300, there is a set of modules specifically required to support that target processor. For example, ARM 310 contains ARM module set 312, which in the present example include ARMmodule1.dll, ARMmodule2.dll, and ARMmodule3.dll, where ".dll" denotes a dynamically loaded library. Upon connection to the target, debug core 220 communicates with the debuggable target through debug interface 274. Once the target type has been selected from target database 300, debug core 220 is given the name of the target processor, e.g. ARM 310, via communication line 228, as one of its input arguments. Debug core 220 then dynamically loads the module set corresponding to the target processor, e.g. ARM module set 312. The information contained in ARM module set 312 is transmitted to debug info/loader 230, disassembler 240, and target support 250, via communication lines 221, 222, and 223, respectively. To retarget debugger 210 for a new processor that is not listed in target database 300, the processor name is added to target database 300, and a module set is created and listed under the processor name.

Additionally, debug core 220 computes the name of a target configuration file using the name of the target processor. The target reconfiguration file has information about target-specific libraries such as the disassembler, symbolic information loader, and target support. The target reconfiguration file acts as a database that lists all the available debuggable target libraries for that target processor. Thus, in debugging ARM 310, ARM module set 312 is loaded and used by debug info/loader 230, disassembler 240, and target support 250, to adapt debugger 210 to the ARM processor. In the manner described above, debugger 210 is retargeted by dynamically loading the target-specific support components based on the module set that is selected from target database 300. This dynamically loaded, modular approach provides faster, more simplified retargetability, as well as more flexibility in adding or modifying target-specific support components.

Figure 4:
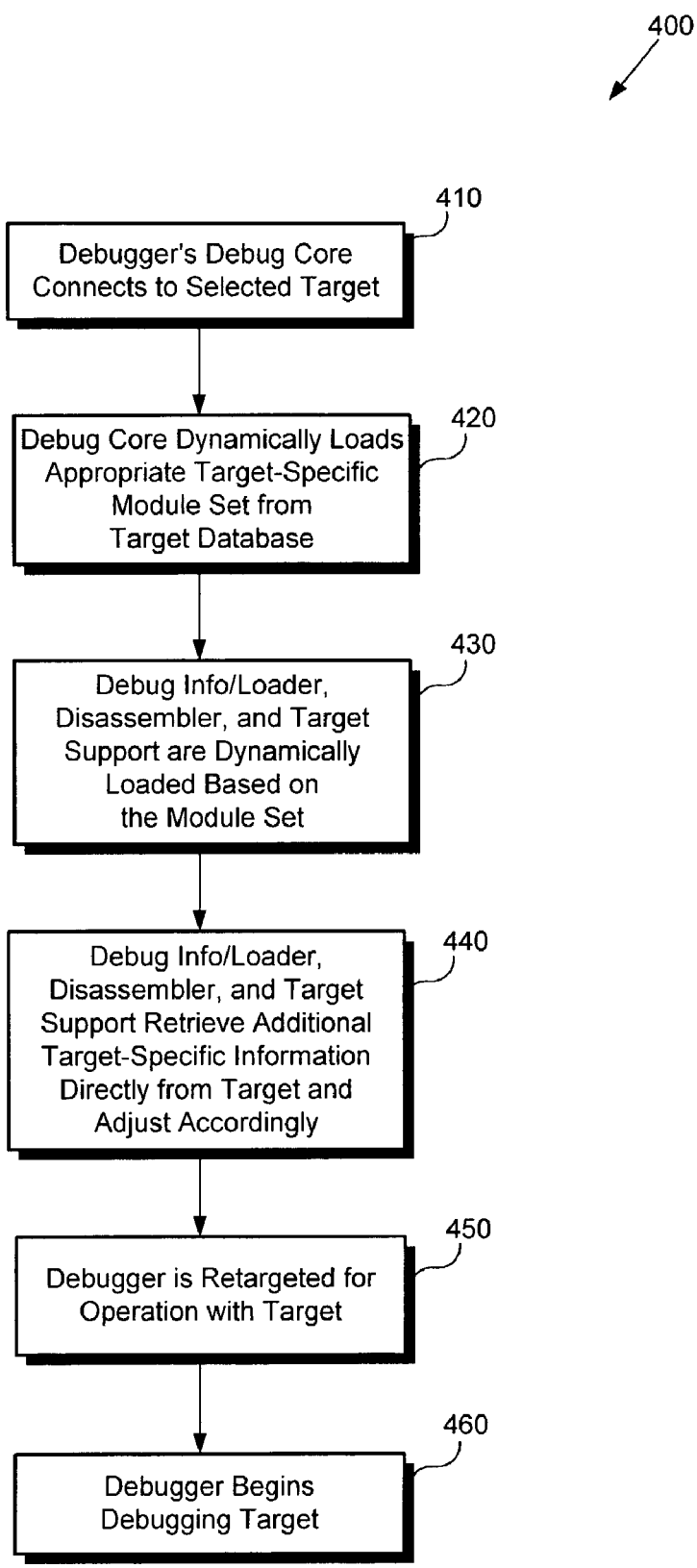
FIG. 4 illustrates an exemplary process within the invention's debugging system.

Referring to FIG. 4, process 400 illustrates an exemplary process within the present invention. For the purpose of clarity, the following description of process 400 includes references to debugging system 200 of FIG. 2. At step 410 of process 400, debugger 210 connects to the selected target, e.g. target 270, via communication line 227 and debug interface 274. Continuing with step 420, debug core 220 dynamically loads a module set from the target database, e.g. target database 300, that corresponds to the selected target. In step 420, debugger 210 utilizes APIs, via communication line 228, to retrieve the aforementioned target-specific memory and register information, as previously discussed in the description of debugging system 200 of FIG. 2. At step 430, debug info/loader 230, disassembler 240, and target support 250 are dynamically loaded based on the module set loaded by debug core 220 via communication lines 221, 222, and 223. Next, at step 440, debug info/loader 230, disassembler 240, and target support 250 directly connect to target 270 via communication lines 234, 244, and 254, respectively, retrieve additional target-specific information, and adjust accordingly. At step 450, debugger 210 is now retargeted for selected target 270. Finally, at step 460, debugger 210 is ready to begin debugging target 270.

In the present invention, debugger 210 achieves retargetability without reconfiguration of debug core 220 or communication lines 221, 222, or 223. Rather, debugger 210 utilizes a set of target-specific support components which are dynamically loaded based on a module set selected from a target database. When a new target is introduced to debugger 210, process 400 is carried out and debugger 210 is able to "retarget" itself and begin debugging the new target. This adaptive ability of debugger 210 allows its use with a variety of targets. This is in contrast to the considerable time and technical labor that is required to retarget conventional debuggers.

Thus, the invention provides method and system for adapting a debugger to new targets. Those of skill in the art would understand that information and signals may be represented using any of a variety of different technologies and techniques. For example, data, instructions, commands and information that may be referenced throughout the above description may be represented by voltages, currents, electromagnetic waves, magnetic fields or particles, optical fields or particles, or any combination thereof.

Those of skill in the art would further appreciate that the various illustrative system blocks, logical blocks, modules, and algorithm or method steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative system blocks, logical blocks, and modules described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. The software module, also called a computer program in the present application, may contain a number of source code or object code segments and may reside in any computer readable medium such as a RAM memory, flash memory, ROM memory, EPROM memory, EEPROM memory, registers, hard disk, a removable disk, a CD-ROM, a DVD-ROM or any other form of computer readable medium known in the art. An exemplary computer readable medium is coupled to a processor, where the processor can read information from, and write information to, the computer readable medium. In the alternative, the computer readable medium may be integral to the processor. The processor and the computer readable medium may reside in an ASIC. In the alternative, the processor and the computer readable medium may reside as discrete components.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, method and system for adapting a debugger to new targets have been described.

What is claimed is:

1. A method for adapting a debugger to a target, said method comprising steps of:
   connecting a debug core of said debugger to said target;
   dynamically loading a module set corresponding to said target;
   dynamically loading a debug info/loader based on said module set;
   adapting said debugger to said target based on said module set and said debug info/loader, wherein said debug info/loader independently accesses said target.

2. The method of claim 1 further comprising a step of dynamically loading a disassembler based on said module set.

3. The method of claim 2 further comprising a step of retrieving target-specific information by said disassembler from said target.

4. The method of claim 3 wherein said target-specific information comprises target-specific memory, register, and file format information.

5. The method of claim 3 wherein said step of retrieving said target-specific information by said disassembler comprises a step of utilizing at least one API.

6. The method of claim 1 further comprising a step of dynamically loading a target support based on said module set.

7. The method of claim 6 further comprising a step of retrieving target-specific information by said target support from said target.

8. The method of claim 7 wherein said target-specific information comprises target-specific memory, register, and file format information.

9. The method of claim 7 wherein said step of retrieving said target-specific information by said target support comprises a step of utilizing at least one API.

10. The method of claim 1 further comprising a step of retrieving target-specific information by said debug core from said target.

11. The method of claim 10 wherein said target-specific information comprises target-specific memory, register, and file format information.

12. The method of claim 10 wherein said step of retrieving said target-specific information by said debug core comprises a step of utilizing at least one API.

13. A debugging system comprising:
   a target;
   a debugger;
   a debug core within said debugger;
   a module set within a database in said debugger, said module set corresponding to said target;
   wherein said debugger includes dynamically loaded target-specific information comprising a debug info/loader based on said module set, and wherein said debug info/loader independently accesses said target.

14. The debugging system of claim 13 wherein said dynamically loaded target-specific information comprises a disassembler.

15. The debugging system of claim 13 wherein said dynamically loaded target-specific information comprises a target support.

16. The debugging system of claim 13 wherein said debug core is capable of receiving target-specific information from said target through a plurality of register APIs and a plurality of memory APIs.

17. A computer readable medium embodying a computer program for adapting a debugger to a target, said computer program comprising:
   a first code segment for connecting a debug core of said debugger to said target;
   a second code segment for dynamically loading a module set corresponding to said target;
   a third code segment for dynamically loading a debug info/loader based on said module set, wherein said debug info/loader independently accesses said target;

a fourth code segment for adapting said debugger to said target based on said module set and said debug info/loader.

18. The computer readable medium of claim 17 further comprising a fifth code segment for dynamically loading a disassembler based on said module set.

19. The computer readable medium of claim 18 further comprising a sixth code segment for dynamically loading a target support based on said module set.

20. The computer readable medium of claim 17 further comprising a fifth code segment for retrieving target-specific information by said debug core from said target.

21. The computer readable medium of claim 20 wherein said target-specific information comprises target-specific memory, register, and file format information.

22. The computer readable medium of claim 20 further comprising a sixth code segment for utilizing at least one API to retrieve said target specific information.

23. The computer readable medium of claim 17 wherein said computer readable medium is selected from the group consisting of a CD-ROM and a DVD-ROM.

* * * * *

UNITED STATES PATENT AND TRADEMARK OFFICE
CERTIFICATE OF CORRECTION

PATENT NO. : 6,938,185 B1 Page 1 of 1
APPLICATION NO. : 10/180480
DATED : August 30, 2005
INVENTOR(S) : Bebout et al.

It is certified that error appears in the above-identified patent and that said Letters Patent is hereby corrected as shown below:

In the claims, column 8, line 12, "APT" should be changed to – API --.

Signed and Sealed this

Fifth Day of September, 2006

JON W. DUDAS
*Director of the United States Patent and Trademark Office*